Feb. 9, 1960 — W. J. FOSTER — 2,924,122
MECHANICAL CONTROL DEVICE
Filed Dec. 1, 1955

INVENTOR
William J. Foster
BY
J. C. Thorpe
ATTORNEY

United States Patent Office 2,924,122
Patented Feb. 9, 1960

2,924,122

MECHANICAL CONTROL DEVICE

William J. Foster, Largo, Fla., assignor to General Motors Corporation, Detroit, Mich., a corporation of Delaware Application December 1, 1955, Serial No. 550,364

9 Claims. (Cl. 74—674)

This invention relates to a servo mechanism and more particularly to a derivative control for a servo mechanism.

In order to reduce errors in the response of a servo mechanism to an input signal and to stabilize such a system, it is frequently desirable to supply an additional signal or signals proportional to derivatives of the input signal. Thus, if the input signal is changing in magnitude with time, a signal proportional to the first derivative of the input signal with respect to time will tend to anticipate such change, speed up the system response, and reduce the system error. If the input is accelerating appreciably, a signal proportional to the second derivative of the input will have a similar effect.

In most servo systems, the error-sensing devices are responsive to variations in an electrical input voltage; the derivative signals being supplied by tachometers or electrical networks or combinations of both. However, such electrical servo systems are relatively complex, expensive to manufacture, and tend to be somewhat delicate.

Recently, there has been a tendency toward mechanical and hydraulic servos which are better adapted to withstand inertia forces and vibrations present in certain applications, but such servos have also been relatively complex and expensive. Such mechanical and hydraulic servos make no use of electrical signals or electrical error-sensing devices, using shaft rotations for input and output signals and differentials for sensing error.

The principal object of the invention is to provide an improved, simplified mechanical derivative control device for a servo mechanism. The combined means for accomplishing this object will become apparent by reference to the following detailed description and the accompanying drawing illustrating several of various possible embodiments thereof in which similar reference characters therein indicate corresponding parts throughout the several views. In the drawing.

Figure 1:
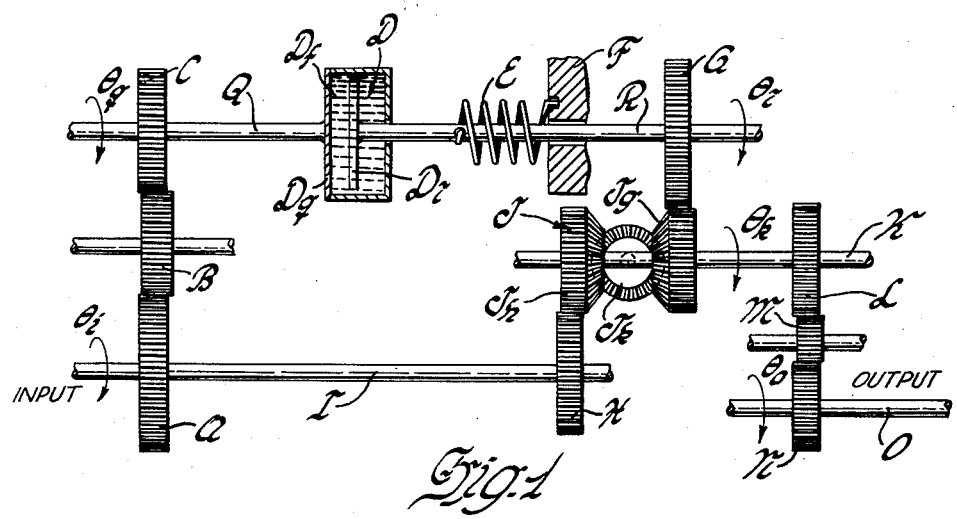
Figure 1 is a somewhat diagrammatic view of one form of the invention.

Referring more particularly to Figure 1, an input shaft I is adapted to be rotatably driven by an input signal, the rotation of which is designated $\theta_1$. The rotation $\theta_1$ of the shaft I is transmitted to shaft Q by a gear train A, B, and C. The resultant rotation of the shaft Q is designated as $\theta_q$ and may correspond in magnitude and in sense to $\theta_i$ or may be merely proportional thereto depending on the selection of the gears A, B, and C for a particular application. The shaft Q tends to rotatably drive a shaft R coaxially spaced therefrom through a viscous fluid coupling device D interposed therebetween.

The coupling device D comprises an outer casing $D_q$ secured to the shaft Q and spacedly embracing a disc-shaped element $D_r$ which is secured to the shaft R. The casing $D_q$ is filled with a viscous fluid which is adapted to establish a viscous drag between the casing $D_q$ and the inner element $D_r$. The consequential tendency of the shaft R to rotate with the shaft Q is resisted by a torsion spring E fastened at one end to the shaft R and at its other end to a fixed support F. Thus, the coupling device D and the spring E constitute a damping means coacting between the shafts Q and R to impart a rotational signal $\theta_r$ to the shaft R proportional to the first derivative of the input signal $\theta_i$; the magnitude and sense of the signal $\theta_r$ corresponding to variations in the rotational velocity of the input signal.

The derivative signal $\theta_r$ is transmitted through a gear G secured to the shaft R to an input gear $J_g$ of a differential J, and a second input gear $J_h$ of the differential is rotatably driven by a gear H carried by the input shaft I at a speed proportional to $\theta_i$. The differential input gears $J_h$ and $J_g$ drivingly engage a differential output gear $J_k$ mounted on a shaft K and thus impart a mean rotation $\theta_k$ thereto representing a combination of the derivative and input signals, $\theta_r$ and $\theta_i$, respectively. The rotation $\theta_k$ is in turn transmitted to an output shaft O through a gear train L, M, and N. In the usual application, the ratio of the gears L, M, and N will be selected to offset the gain of the differential J and thereby provide a rotational output signal $\theta_o$ of substantially the same magnitude and sense as $\theta_i$.

The transfer function $\theta_o/\theta_i$, of the device as hereinbefore described is readily derived in the usual manner by means of Laplace transforms; the term "s" denoting a differentiation equivalent to $d\theta_i/dt$. Using X to represent the damping factor of the fluid coupling in foot pounds per radian per second, and Y to represent the spring force in foot pounds per radian, and assuming inertia to be negligible: $X(\theta_q - \theta_r)s = Y\theta_r$. If the gears A, B, and C are selected so that $\theta_q = \theta_i$, then $$X\theta_i s = (Xs + Y)\theta_r$$

and $$\theta_r = \frac{\frac{X}{Y}s\theta_i}{\frac{X}{Y}s + 1}$$

Assuming the gear train L, M, N to have a gain of 2:1 offsetting a gain of 1:2 through the differential J $$\theta_k = \frac{\theta_r + \theta_i}{2}$$

and $\theta_o = 2\theta_k$. Consequently, $$\theta_o = \theta_r + \theta_i = \frac{\frac{X}{Y}s\theta_i}{\frac{X}{Y}s + 1} + \theta_i$$

and $$\frac{\theta_o}{\theta_i} = \frac{T_1 s}{T_1 s + 1} + 1$$

where $T_1$ is a time constant equal to $$\frac{X}{Y}$$

Thus, it will be seen that the transfer function of the device of Figure 1 is proportional to the input signal plus a first derivative control signal.

Figure 2:
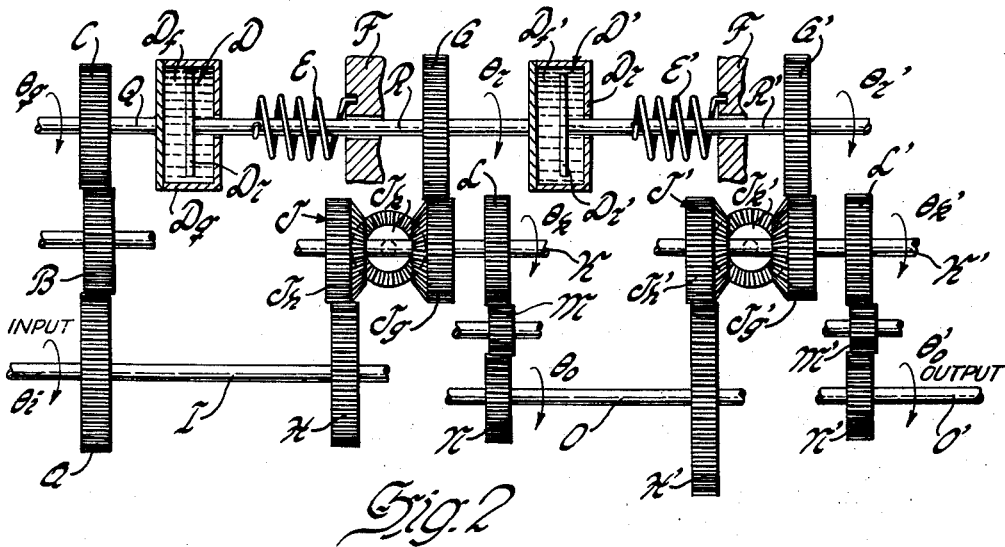
Figure 2 is a similar view of a second form of the invention.

In the form of the invention shown by Figure 2, a second derivative feedback mechanism is added to the first derivative feedback mechanism shown by Figure 1; the cooperative interaction between corresponding elements being the same in both forms of the invention. In the second embodiment, a second viscous fluid coupling device D' is interposed between the shaft R and a shaft R' and tends to rotatably drive shaft R' in accordance with the first derivative rotation $\theta_r$ of the shaft R. The coupling device D' is similar to D and is filled with a viscous fluid which is adapted to establish a viscous drag between an outer casing $D_r$ secured to the shaft R and a disc-shaped inner element $D_r'$ which is spacedly embraced thereby. The element D' is secured to the shaft R' and a torsion spring E' fastened at one end to the shaft R' and at its other end to the fixed support F resists the tendency of the shaft R' to rotate with the shaft R. Thus, the coupling device D' and the spring E' coact between the shafts R and R' to impart a rotational signal $\theta_r'$ to the shaft R' proportional to the second derivative of the input signal $\theta_i$; the magnitude and sense of the signal $\theta_r$ corresponding to variations in the rotational acceleration of the input signal with respect to time.

The second derivative signal $\theta_r'$ is combined with the rotative signal $\theta_o$ through a differential J'; a gear G' secured to the shaft R' and a gear H' carried by the shaft O drivingly engaging input gears $J_g'$ and $J_h'$, respectively, of the differential which are rotatably mounted on a shaft K' in axially spaced relation. The differential input gears $J_h'$ and $J_g'$ drivingly engage a differential output gear $J_k'$ interposed therebetween and carried by the shaft K' and thus impart a mean rotation $\theta_k'$ thereto representing an output signal proportional to the derivative signals $\theta_r$ and $\theta_r'$ and the input signal $\theta_i$. A gear train L', M', and N', in turn, transmits the rotation $\theta_k'$ to an output shaft O' and in the usual application, the ratio of the gears L', M', and N' will be selected to offset the gain of the differential J' thereby providing a rotational output signal $\theta_o'$ of substantially the same magnitude and sense as $\theta_i$.

The transfer function for the form of the invention shown in Figure 2 is derived by the use of Laplace transforms in the same manner as for Figure 1. It has been shown in connection with Figure 1 that $$\frac{\theta_o}{\theta_i} = \frac{T_1 s}{T_1 s + 1} + 1$$

in the simplest case where $\theta_q$ was equal to $\theta_i$. If X' is taken to the damping factor of the second fluid coupling D', and Y' to be the rate of spring E', then $$X'(\theta_r - \theta_r')s = Y'(\theta_r')$$

and $X's\theta_r = (X's + Y')\theta_r'$. Hence, $$\theta_r' = \frac{\frac{X'}{Y'}s\theta_r}{\frac{X'}{Y'}s + 1}$$

Substituting $T_2$ for $$\frac{X'}{Y'}$$

and the value of $\theta_r$ in terms of $\theta_i$ as previously found, $$\theta_r' = \frac{T_1 T_2 s^2 \theta_i}{(T_1 s + 1)(T_2 s + 1)}$$

Consequently $$\theta_o' = \theta_r' + \theta_o = \frac{T_1 T_2 s^2 \theta_i}{(T_1 s + 1)(T_2 s + 1)} + \frac{T_1 s \theta_i}{T_1 s + 1} + \theta_i$$

and $$\frac{\theta_o'}{\theta_i} = \frac{T_1 T_2 s^2}{(T_1 s + 1)(T_2 s + 1)} + \frac{T_1 s}{T_1 s + 1} + 1$$

Thus, it will be seen that the transfer function $\theta_o'/\theta_i$ of the mechanism of Figure 2 is proportional to the input signal plus first and second derivative control signals.

With either embodiment of the invention, the magnitude and sense of the derivative control signals supplied to the input signal for a given application will necessarily be controlled by damping factors of the fluid couplings, the rates of the spring, and the drive ratios of the several gear trains and differentials.

In those applications where an output signal proportional to the input signal plus a second derivative control signal alone is required, differential J can be omitted and shaft I can be directly connected to gear H' and thereby to the second differential J'.

As indicated above, the invention has particular application to servo mechanism utilizing derivative feedback to reduce error and stabilize the system, but it will be understood by those skilled in the art that the invention has application in any data-transmitting mechanism in which accurate positional control is desired. Consequently, while only two embodiments of the invention have been shown and described for the purpose of illustration, it is appreciated that various modifications may be made without departing from the spirit and scope of the invention as defined in the following claims.

I claim:

1. In a control mechanism, a mechanical differentiating device including a first member movable in proportion to an input signal imposed on said control mechanism, a second member, hydraulic coupling means interposed between said first and second members and having inherent slippage characteristics, said hydraulic coupling means tending to drivingly interconnect said first and second members, means biasing said second member to limit movement thereof whereby the movement of said first member imparts a movement to said second member proportional to the first derivative of the input signal with respect to time, a third member, a second hydraulic coupling means interposed between said second and third members and having inherent slippage characteristics, said hydraulic coupling means tending to drivingly interconnect said second and third members, and means biasing said third member to limit the movement thereof whereby the movement of said second member imparts a movement to said third member proportional to the second derivative of the input signal with respect to time.

2. A positional control device including a first shaft rotatably driven in proportion to an input signal imposed on said control device, a second shaft, a fluid coupling unit including a housing fixed to one of said shafts and a disc disposed in said housing and fixed to the other of said shafts tending to drivingly interconnect said first and second shafts, means biasing said second shaft to limit the rotation thereof whereby the rotation of said first shaft imparts a rotational signal to said second shaft proportional to the first derivative of the input signal with respect to time, a third shaft, a second fluid coupling tending to drivingly interconnect said second and third shafts, said second coupling unit including a housing fixed to one of said second and third shafts and a disc member disposed in said housing and fixed to the other of said second and third shafts, and means biasing said third shaft to limit the rotation thereof whereby the rotation of said second shaft imparts a rotational signal to said third shaft proportional to the second derivative of the input signal with respect to time.

3. A control device as set forth in claim 2 and including differential gear means drivingly interconnecting said first and third shafts to combine portions of said input signal with a portion of said second derivative signal.

4. A control device as set forth in claim 2 and including differential gear means drivingly interconnecting said first, second, and third shafts to combine portions of said input signal with portions of said first and second derivative signals.

5. A differentiating device for a power-transmitting positional control mechanism comprising, in combination, a first shaft rotatably driven in accordance with an input signal, a second shaft, torsional means limiting the rotation of said second shaft, viscous damping means interposed between said first and second shafts and tending to drivingly interconnect said first and second shafts, said damping means including a housing fixed for rotation with one of said shafts and a disc member disposed in said housing and fixed to the other of said shafts for rotation therewith, the rotation of said first shaft thereby imparting a rotational signal to said second shaft proportional to the derivative of the rotational velocity of the input-signal-driven first shaft, a third shaft, torsional means limiting the rotation of said third shaft, a second viscous damping means interposed between said second and third shafts whereby the rotation of said second shaft imparts a rotational signal to said third shaft proportional to the derivative acceleration of the input-signal-driven first shaft, said second damping means including a housing fixed to one of said second and third shafts for rotation therewith, and a disc member disposed in said housing and fixed to the other of said second and third shafts for rotation therewith, differential gear means drivingly interconnecting said first and said second shafts, and a second differential means drivingly interconnecting said first differential means and said third shaft to combine portions of said input signal with portions of said velocity and acceleration signals.

6. In a power-transmitting mechanism, a positional control device comprising, in combination, an input-signal-driven first shaft, a second shaft, viscous damping means interposed between said first and second shafts tending to drivingly interconnect said first and second shafts, said damping means including a housing fixed to said first shaft for rotation therewith and a disc member disposed in said chamber and fixed to said second shaft for rotation therewith, torsional means resiliently biasing said second shaft against the driving tendency imposed thereon thereby imparting a signal to said second shaft proportional to the velocity derivative of the input signal, a third shaft, a second viscous damping means interposed between said second and third shafts tending to drivingly interconnect said second and third shafts, said second damping means including a rotatable housing fixed to said second shaft for rotation therewith and a disc member fixed to said third shaft for rotation therewith, torsional means resiliently biasing said third shaft against the driving tendency imposed thereon whereby the rotation of said second shaft imparts a signal to said third shaft proportional to the acceleration derivative of the input signal, and differential gear means drivingly interconnecting said first, second, and third shafts to combine portions of said input, velocity, and acceleration signals.

7. A mechanical derivative control device including a rotatable power input shaft, a second shaft driven by said power input shaft, a third shaft mounted for limited angular rotation, hydraulic torque transmitting means for transmitting torque from said second to said third shaft, yieldable means for permitting limited angular rotation of said third shaft and for opposing rotation of said third shaft by said hydraulic torque transmitting means, a gear fixed to said third shaft for rotation therewith, a fourth shaft, a differential gear unit power delivery gear fixed to said fourth shaft for rotating said fourth shaft, a differential power input gear driven by said first shaft and meshing with said power delivery gear, a third differential gear in mesh with said differential power delivery gear and with the gear fixed to said third shaft, a fifth shaft mounted for limited angular rotation, a hydraulic torque transmitting mechanism for transmitting torque from said third to said fifth shaft, yieldable means for permitting limited angular rotation of said fifth shaft and for opposing rotation of said fifth shaft by said third shaft, a gear fixed to said fifth shaft for rotation therewith, a sixth shaft having a differential gear unit output gear affixed thereto, a differential gear unit power input gear driven by said fourth shaft and in mesh with said last-mentioned differential gear unit output gear, and a third differential gear driven by the gear fixed to said fifth shaft and in mesh with said last-mentioned differential gear unit output gear.

8. A mechanical derivative control device for controlling the speed of rotation of a power delivery shaft including a power input shaft, a first differential gear unit having a power delivery gear, a first power input gear in mesh with said power delivery gear and driven by said power input shaft and a second power input gear in mesh with said power delivery gear, a second shaft driven by said power input shaft, a third shaft connected in drive relationship to said second power input gear of said first differential gear unit, a hydraulic torque transfer device for transmitting torque from said second to said third shaft, torsion spring means for permitting limited rotation of said third shaft, said hydraulic torque transfer device and said torsion spring being effective to prevent rotation of said third shaft during constant speed rotation of said power input shaft and constituting a dampening means coacting upon variation in the speed of rotation of said power input shaft to impart limited rotation to said third shaft proportional to the first derivative of the variation in speed of rotation of said power input shaft, a second differential gear unit having a power delivery gear fixed to said power delivery shaft, a first power input gear in mesh with said power delivery gear and driven by the power delivery gear of said first differential gear unit, said second differential gear unit having a second power input gear in mesh with said second gear unit power delivery gear, a fourth shaft connected in drive relationship with said second power input gear of said second differential gear unit, a hydraulic torque transfer device for transmitting torque from said third shaft to said fourth shaft, a torsion spring for permitting limited rotation of said fourth shaft, said hydraulic torque transfer device and said torsion spring constituting a dampening means coacting upon variation in the speed of rotation of said third shaft and the power delivery gear of said first differential gear unit to impart limited rotation to said fourth shaft proportional to the second derivative of the variation of the speed of rotation of said power input shaft.

9. A mechanical derivative control device comprising a rotatable power input shaft, a second shaft laterally spaced from said power input shaft and extending parallel thereto, means including a first gear fixed to said power input shaft, an idler gear and a third gear fixed to said second shaft for rotating said second shaft at a speed proportional to the speed of rotation of said power input shaft and in the same direction as the direction of rotation of said power input shaft, a third shaft coaxial with said second shaft and mounted for limited angular rotation, a hydraulic torque transmitting device intermediate said second and third shaft adapted to transmit limited torque from said second to said third shaft, torsion spring means associated with said third shaft for permitting limited angular rotation of said third shaft and for opposing rotation of said third shaft by said second shaft, a gear fixed to said third shaft for rotation therewith, a fourth shaft, a differential gear unit for transmitting torque to said fourth shaft including a power delivery gear fixed to said fourth shaft for rotation therewith, a second gear driven by said power input shaft, a differential gear unit power input gear in mesh with said second power input shaft driven gear and said differential gear unit power delivery gear, and a third differential gear unit gear in mesh with the gear driven by said third shaft and said differential gear unit power delivery gear, said third shaft and the gears driven thereby being held against rotation when the speed of rotation of said power input shaft is constant and being rotated through a limited angular rotation upon a change of rate of rotation of said power input shaft to tend to maintain the speed of rotation of said fourth shaft at a constant speed of rotation.

(References on following page)

References Cited in the file of this patent

UNITED STATES PATENTS

| | | |
|---|---|---|
| 1,001,065 | Mursch | Aug. 22, 1911 |
| 1,977,553 | Halford | Oct. 16, 1934 |
| 2,049,375 | Henderson | July 28, 1936 |
| 2,404,011 | White | July 16, 1946 |
| 2,442,389 | Weiss | June 1, 1948 |
| 2,540,989 | Newell | Feb. 6, 1951 |
| 2,586,941 | Gretener et al. | Feb. 26, 1952 |
| 2,629,472 | Sterner | Feb. 24, 1953 |

FOREIGN PATENTS

| | | |
|---|---|---|
| 349,906 | Great Britain | May 26, 1941 |
| 380,346 | Great Britain | Sept. 15, 1932 |

OTHER REFERENCES

Proceedings of the I.R.E., vol. 35, No. 7, May 1947.